(No Model.) 2 Sheets—Sheet 2.
J. W. TAYLOR.
VEHICLE RUNNING GEAR.
No. 482,597. Patented Sept. 13, 1892.
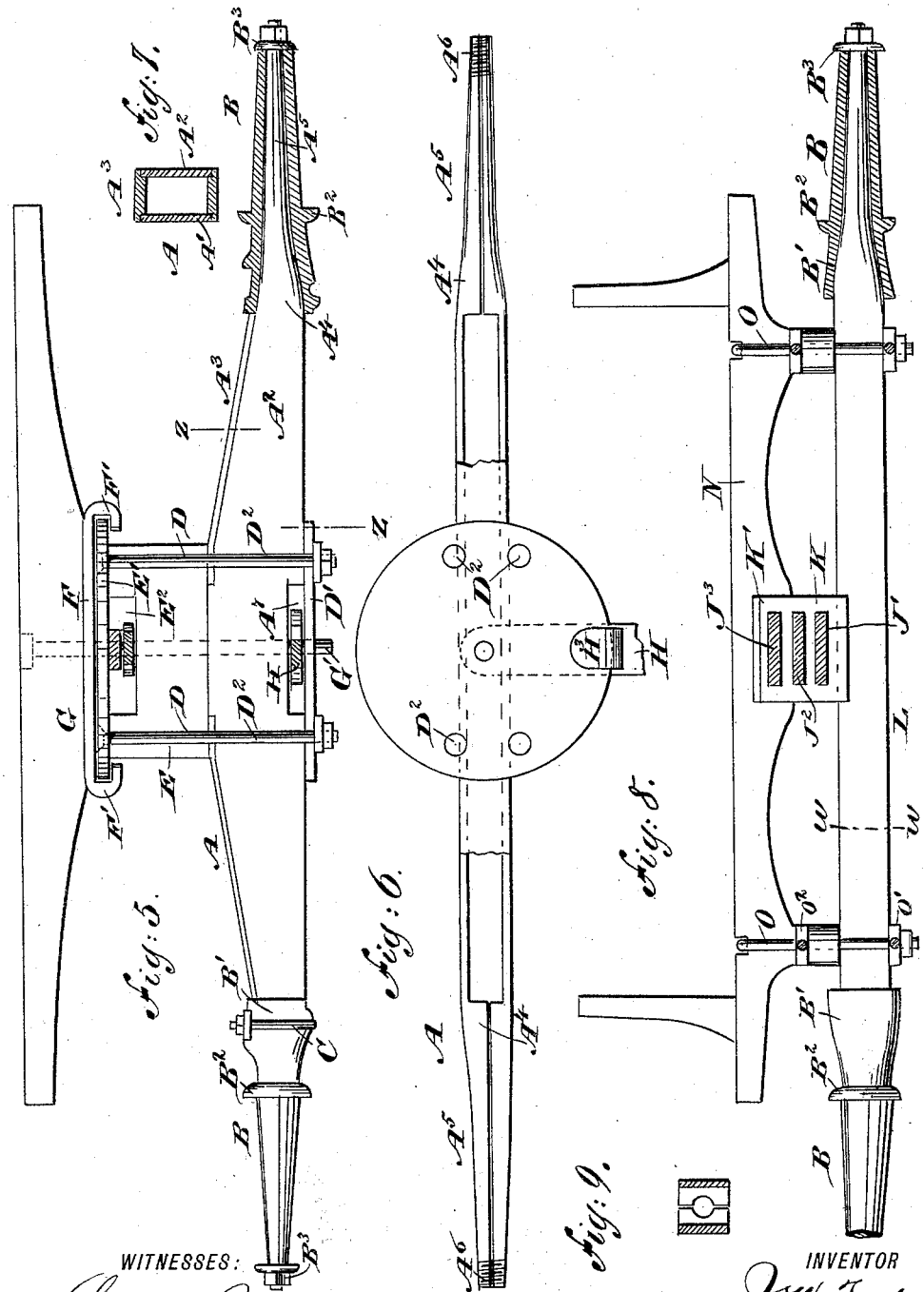
WITNESSES:
Chas. Nicol.
C. Sedgwick
INVENTOR
J. W. Taylor
BY Munn & Co.
ATTORNEYS

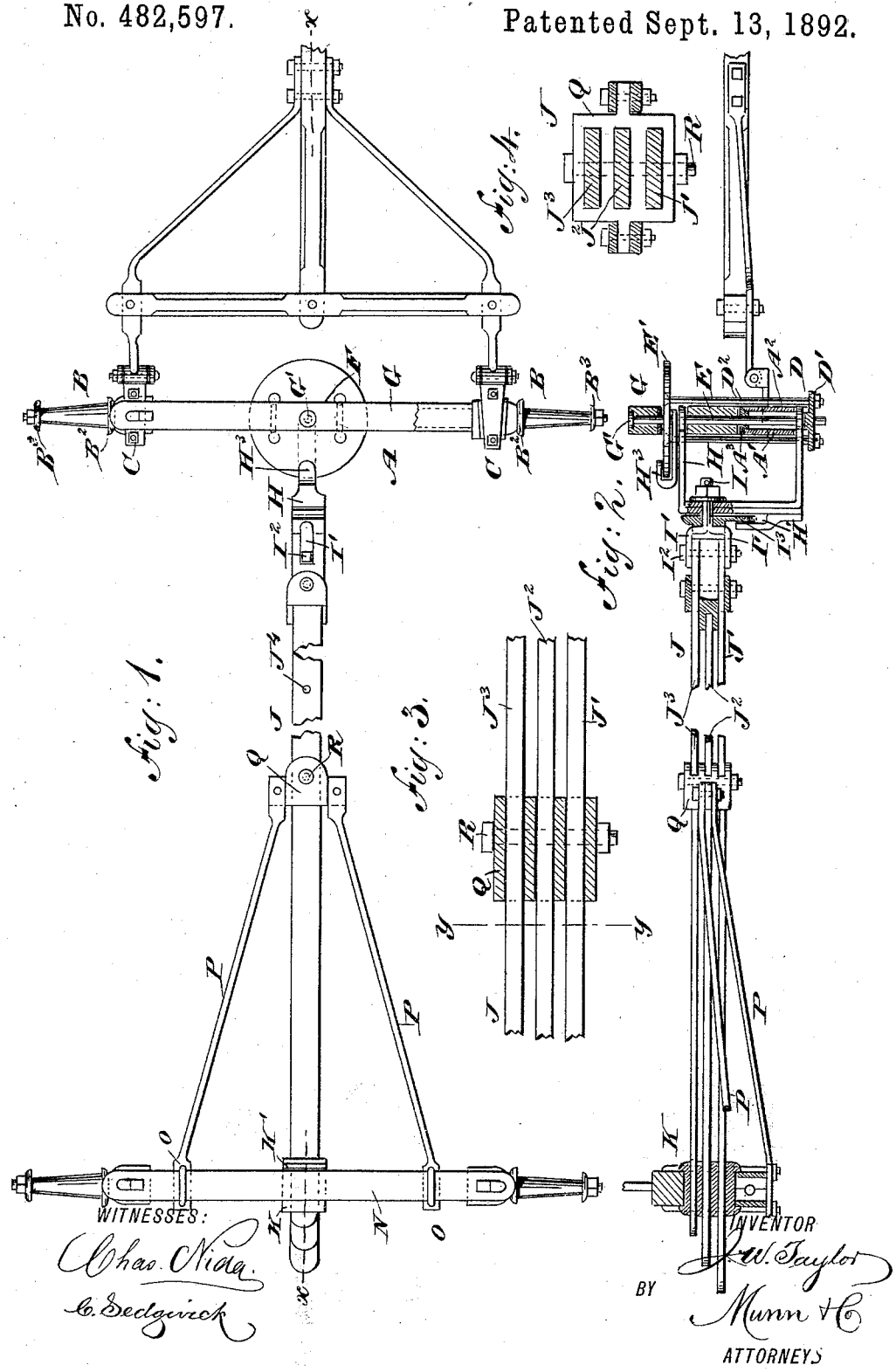

UNITED STATES PATENT OFFICE.

JAMES W. TAYLOR, OF VERMILLION, SOUTH DAKOTA.

VEHICLE RUNNING-GEAR.

SPECIFICATION forming part of Letters Patent No. 482,597, dated September 13, 1892.

Application filed November 2, 1891. Serial No. 410,796. (No model.)

*To all whom it may concern:*

Be it known that I, JAMES W. TAYLOR, of Vermillion, in the county of Clay and State of South Dakota, have invented new and useful Improvements in Vehicles, of which the following is a full, clear, and exact description.

The invention relates to improvements in vehicles, especially couplings, such as shown and described in the application for Letters Patent of the United States, Serial No. 400,108, filed by me July 20, 1891.

The object of the invention is to provide certain new and useful improvements in vehicles, whereby the front and rear axles are conveniently and securely connected without undue strain on the king-bolt or bolsters, and whereby the axles are greatly strengthened and arranged to permit of removing a worn-out thimble to replace the same by a new one.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement with parts broken out. Fig. 2 is a sectional side elevation of the same on the line $x$ $x$ of Fig. 1. Fig. 3 is an enlarged longitudinal section of the reach-rod bearing. Fig. 4 is a transverse section of the same on the line $y$ $y$ of Fig. 3. Fig. 5 is an enlarged front elevation of the front axle and fifth-wheel with parts in section. Fig. 6 is a plan view of the same with the thimbles removed and parts broken out. Fig. 7 is a transverse section of the same on the line $z$ $z$ of Fig. 5. Fig. 8 is a front view of the rear axle with parts in section, and Fig. 9 is a transverse section of the same on the line $w$ $w$ of Fig. 8.

The front axle A of the vehicle is made of metal and is composed of two side plates A′ and A², arranged parallel and transversely and covered on top by a plate A³, formed on the under side with a projection extending a short distance between the side plates A′ and A², as is plainly shown in Fig. 7. The ends of the side plates A′ and A² abut one on the other and are rounded to form a head A⁴, from which extends the tapering spindle A⁵, formed at its outer end with a screw-thread A⁶, it being understood that the head, as well the spindle A⁵, are made in two parts and are a continuation of the side plates A′ and A².

On the spindles A⁵ of the axle are fitted the thimbles B, each provided with a head B′, fitting onto the head A⁴ on the respective end of the side plates A′ and A². A clip C is secured on each head and supports the tongue or pole of the vehicle. The thimbles are shrunk in the usual manner to the spindles A⁵ and head A⁴, and each is provided with a collar B², against which abuts the inner end of the hub of the wheel, the outer end of the hub being held in place by the usual flanged nut B³, screwing on the threaded end A⁶ of the respective spindle A⁵. The side plates A′ and A² of the axle A are slightly tapering, as is plainly shown in Fig. 5, the central part being flat at the top and supporting a block E, carrying a disk E′, which, with the block E, is securely held in place by a clip D, the bottom plate D′ of which rests on the under side of the two side plates A′ and A² of the axle A, while the bolts D² of the said clip are connected at their upper ends with the disk E′ and extend in front and rear of the axle. The outer edge of the disk E′ is engaged at opposite sides by the downward and inward bent flanges F′ of a plate F, attached to the under side of the bolster G, carrying the king-bolt G′, extending through the disk E′, block E, and bottom plate D′ of clip D.

On the king-bolt G′ is held to turn a frame H, preferably U-shaped and having its ends engaging the king-bolt in recesses E² and A⁷, formed in the block E and axle A, respectively. The middle part of the U-shaped frame H extends vertically and has mounted to turn in it a bolt I, extending horizontally and formed on its inner end with a fork I′, engaged by a bolt I², held in the front end of the reach-rod J. An arm I³ is secured to the bolt I and is fitted to swing in a guideway H′, formed on the middle part of the frame H. On top of the latter is secured a flanged guide H³, engaging the disk E′.

The device above described forms a universal joint between the axle and reach-rod, in addition to the independent swinging or turning of the bolster G. The axle swings on the king-bolt G′, pivotally connected with the frame H, and the latter is mounted to turn on the front end of the reach-rod J. The latter is preferably composed of bars or rods J', J², and J³, located one above the other and having their front ends connected with each other by suitable means. The rear ends of the bars forming the reach-rod J are fitted to slide in a bearing K, supported on the top of the rear axle L, made similar in construction to the front axle A, with the exception of the covering-plates A³ and the clips C. The rear axle L supports the sand or rear bolster N, which also rests with its middle part on a flanged head K', formed on top of the bearing K. The bolster N is fastened by clips O to the rear axle L, and the bottom and middle plates O' and O², respectively, of the said clips are continued into rods P, extending forward, and at their front ends are bolted or otherwise fastened to a bearing Q, through which pass the bars of the reach-rod and which is fastened to the same by a bolt R. The bolt R is adapted to engage one of a series of apertures J⁴ in the reach-rod J to lengthen or shorten the distance between the two axles.

It will be seen that the universal vehicle-coupling permits of convenient movement of the front axle in any direction relative to the wagon-body and reach-rod and rear axle, and at the same time the latter's movement does not affect the front axle. It will further be seen that axles constructed in the manner shown and described are very strong and durable and not liable to break, and a thimble when worn out can be readily removed and replaced by a new one.

In the construction of the axles I prefer to use steel plates.

Having thus described my invention, I claim as new and desire to secure by Letters Patent—

1. A vehicle-axle formed of two separate and independent side plates having their ends rounded to form spindles and a top plate fitting upon the side plates, substantially as described.

2. A vehicle provided with an axle comprising separate and independent side plates made of metal and having their ends formed into heads and spindles and thimbles shrunk on the said spindles and heads, substantially as shown and described.

3. A vehicle provided with an axle comprising separate and independent side plates made of metal and having their ends formed into heads and spindles, thimbles shrunk on the said spindles and heads, and a flanged nut screwing on the outer threaded end of each spindle to abut against the end of the thimble, substantially as shown and described.

4. The combination, with an axle, of a block on the axle, a disk above the block, a clip for securing the disk and block to the axle, a king-bolt passing through the disk, block, and axle, a U-shaped frame having its ends entering recesses in the block and axle and pivoted on the king-bolt, and a flanged guide secured to the frame and engaging the disk, substantially as described.

5. The combination, with a frame pivoted to the front axle and provided with a guideway H', of a fork I', secured to the reach and provided with a bolt I, by which the reach is pivoted to the frame, and the arm I³, secured to the bolt I and working in the guideway H', substantially as herein shown and described.

6. In a vehicle, the combination, with a reach-rod made in several parts, of a rear axle, a bearing secured on the said rear axle, and in which is fitted to slide the said reach-rod, a bolster attached to the said rear axle, a bearing supported from the said rear axle and engaging the said reach-rod in front of the rear axle, and a bolt for connecting the last-mentioned bearing with the said reach-rod, substantially as shown and described.

7. In a vehicle, a reach-rod made in several parts, connected with each other at their front ends, a bearing supported upon the rear axle, rods projecting from the rear axle, and a bearing to which the said rods are secured, each bearing being formed with openings for the independent passage of the several parts of the reach-rod, substantially as shown and described.

JAMES W. TAYLOR.

Witnesses:
C. H. BARRETT,
H. BANKS.